(12) United States Patent
Kang et al.

(10) Patent No.: US 11,057,577 B2
(45) Date of Patent: Jul. 6, 2021

(54) CAMERA MODULE HAVING MULTI-CELL STRUCTURE AND PORTABLE COMMUNICATION DEVICE INCLUDING THE SAME

(71) Applicant: Samsung Electronics Co., Ltd, Suwon-si (KR)

(72) Inventors: Hwayong Kang, Suwon-si (KR); Jonghun Won, Suwon-si (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/723,976

(22) Filed: Dec. 20, 2019

(65) Prior Publication Data

US 2020/0204746 A1 Jun. 25, 2020

(30) Foreign Application Priority Data

Dec. 21, 2018 (KR) ........................ 10-2018-0167437

(51) Int. Cl.
*H04N 5/345* (2011.01)
*H04N 5/232* (2006.01)
(Continued)

(52) U.S. Cl.
CPC ....... *H04N 5/3454* (2013.01); *H04N 5/23293* (2013.01); *H04N 5/23296* (2013.01);
(Continued)

(58) Field of Classification Search
CPC .. H04N 5/23296; H04N 5/3454; H04N 5/347; H04N 9/045–04511;
(Continued)

(56) References Cited

U.S. PATENT DOCUMENTS 6,639,625 B1 10/2003 Ishida et al.
7,688,364 B2 3/2010 LeGall et al.
(Continued)

FOREIGN PATENT DOCUMENTS

KR 10-2018-0044198 A 5/2018

OTHER PUBLICATIONS

Notification of Transmittal of the International Search Report and the Written Opinion of the International Searching Authority, or the Declaration dated Apr. 1, 2020 in connection with International Patent Application No. PCT/KR2019/018056, 9 pages.

*Primary Examiner* — Paul M Berardesca

(57) ABSTRACT

A portable communication device configured to activate an image capturing function of a camera module. When the image capturing function is activated, use an image sensor to obtain first raw image data including a specified channel pattern, generated by binning image data obtained from the specified number of image pixels corresponding to the same channel. Display a first image generated based on the first raw image data on a display. While the image capturing function is activated, receive an input associated with adjustment of a zoom setting. Use the image sensor to obtain second raw image data having the specified channel pattern, generated by re-mosaicing image data obtained from some of the plurality of image pixels corresponding to a portion of the image sensor based on the input. Display a second image generated based on the second raw image data on the display.

19 Claims, 11 Drawing Sheets

(51) Int. Cl.
　　　*H04N 5/347*　　　(2011.01)
　　　*H04N 9/04*　　　(2006.01)
　　　*H04N 5/225*　　　(2006.01)
　　　*H04M 1/02*　　　(2006.01)

(52) U.S. Cl.
　　　CPC ....... *H04N 5/232933* (2018.08); *H04N 5/347* (2013.01); *H04N 9/04557* (2018.08); *H04M 1/0264* (2013.01); *H04N 5/2257* (2013.01); *H04N 5/232935* (2018.08)

(58) Field of Classification Search
　　　CPC .. H04N 9/04515; H04N 9/0455–04561; G06T 3/4007; G06T 3/4015
　　　See application file for complete search history.

(56) References Cited

U.S. PATENT DOCUMENTS

| | | |
|---|---|---|
| 9,160,935 B2 | 10/2015 | Schweng et al. |
| 10,609,348 B2 | 3/2020 | Agranov et al. |
| 2010/0066849 A1 | 3/2010 | Lim et al. |
| 2012/0019671 A1 | 1/2012 | Goldberg et al. |
| 2014/0118577 A1* | 5/2014 | Masuda ........... H04N 5/232933 348/240.2 |
| 2014/0313360 A1 | 10/2014 | Lee et al. |
| 2015/0036034 A1* | 2/2015 | Yatabe ................. H04N 5/2351 348/302 |
| 2015/0350575 A1 | 12/2015 | Agranov et al. |
| 2018/0114308 A1 | 4/2018 | Herrmann et al. |
| 2018/0295301 A1 | 10/2018 | Lee et al. |
| 2020/0059614 A1 | 2/2020 | Lee et al. |
| 2020/0077026 A1* | 3/2020 | Jeong ................. H04N 5/23296 |

* cited by examiner

CAMERA MODULE HAVING MULTI-CELL STRUCTURE AND PORTABLE COMMUNICATION DEVICE INCLUDING THE SAME

CROSS-REFERENCE TO RELATED APPLICATION

This application is based on and claims priority under 35 U.S.C. § 119 to Korean Patent Application No. 10-2018-0167437 filed on Dec. 21, 2018, in the Korean Intellectual Property Office, the disclosure of which is incorporated by reference herein its entirety.

BACKGROUND

1. Field

The disclosure relates to a zoom function providing technology using an image sensor.

2. Description of Related Art

A camera may include a multifocal lens that is able to adjust a distance between lenses included in a body tube and a unifocal lens that is not able to adjust the distance between the lenses included in the body tube. A portable electronic device adopts a camera (hereinafter, referred to as a unifocal camera) including the unifocal lens due to a space constraint.

The portable electronic device may include a single unifocal camera and use a digital zoom function that virtually generates some of image pixels to provide a zoom effect. Alternatively, the portable electronic device may include a plurality of unifocal cameras having different focal distances, and switch a camera providing an image from one unifocal camera to another unifocal camera to provide a zoom effect similar to an optical zoom function.

The above information is presented as background information only to assist with an understanding of the disclosure. No determination has been made, and no assertion is made, as to whether any of the above might be applicable as prior art with regard to the disclosure.

SUMMARY

When an electronic device provides a digital zoom function using a single unifocal camera, an image quality of the electronic device may be lowered after adjustment of zoom setting. In addition, when the electronic device provides a zoom function using a plurality of unifocal cameras, not only a cost of the electronic device and complexity may be increased, but also only a zoom function for a center region of an image sensor may be provided.

Various embodiments disclosed in the disclosure provide a camera module having a multi-cell structure and a portable communication device including the camera module that may lower image resolution degradation when adjusting the zoom setting.

Aspects of the disclosure are to address at least the above-mentioned problems and/or disadvantages and to provide at least the advantages described below. Accordingly, an aspect of the disclosure is to provide a portable communication device including a camera module including an image sensor including a plurality of image pixels and a control circuit for controlling the image sensor, a display, and a processor, wherein the processor activates an image capturing function of the camera module, when the image capturing function is activated, uses the image sensor to obtain first raw image data having a specified channel pattern generated by binning image data obtained from the specified number of image pixels corresponding to the same channel with respect to the plurality of image pixels, displays a first image generated based on the first raw image data on the display, while the image capturing function is activated, receives an input associated with adjustment of zoom setting, uses the image sensor to obtain second raw image data having the specified channel pattern generated by re-mosaicing image data obtained from some of the plurality of image pixels corresponding to a portion of the image sensor based at least on the input, and displays a second image generated based on the second raw image data on the display.

Another aspect of the disclosure is to provide a portable communication device including a camera module including an image sensor including a plurality of image pixels and a control circuit for controlling the image sensor, a display, and a processor, wherein the processor receives an input associated with adjustment of zoom setting related to capturing, uses the image sensor to obtain first raw image data generated by binning image data obtained from the first set number of pixels corresponding to the same channel with respect to the plurality of image pixels based on the zoom setting being within a specified first magnification range, and displays a first image generated using the obtained first raw image data on the display, and uses the image sensor to obtain second raw image data generated by re-mosaicing image data obtained from some of the plurality of image pixels corresponding to a portion of the image sensor based on the zoom setting being within a specified second magnification range, and displays a second image generated using the obtained second raw image data on the display.

Another aspect of the disclosure is to provide a camera module including an image sensor including a plurality of image pixels, and a control circuit for controlling the image sensor, wherein the control circuit activates an image capturing function of the image sensor, when the image capturing function is activated, uses the image sensor to generate first raw image data having a specified channel pattern generated by binning image data obtained from the specified number of image pixels corresponding to the same channel with respect to the plurality of image pixels, transmits the generated first raw image data to an external processor electrically connected to the control circuit, receives a request associated with zoom setting while the image capturing function is activated, uses the image sensor to generate second raw image data having the specified channel pattern by re-mosaicing image data for some of the plurality of image pixels corresponding to a portion of the image sensor based at least on the request, and transmits the generated second raw image data to the external processor.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

In the description of the drawings, the same or similar reference numerals may be used for the same or similar components.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
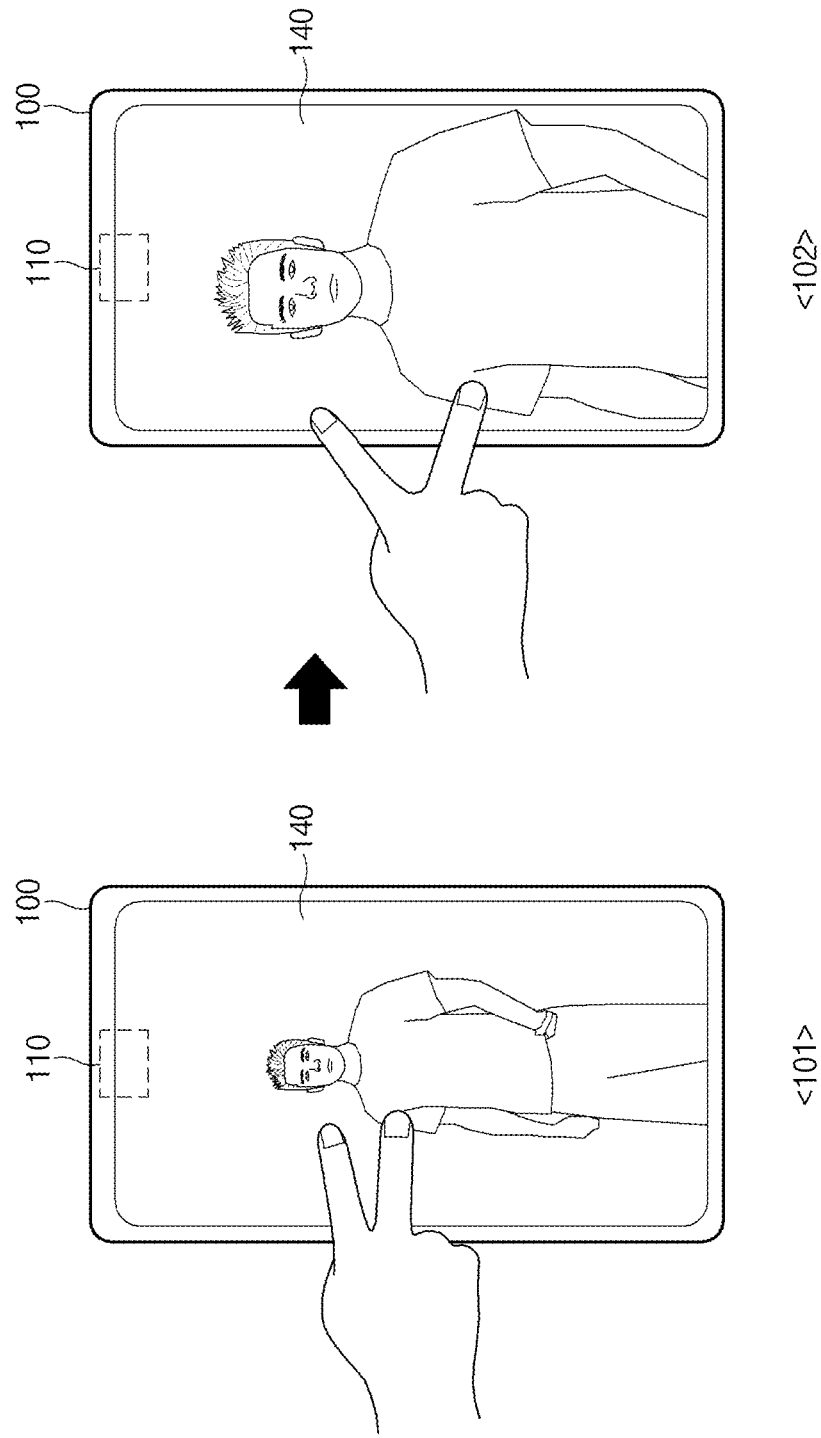
FIG. 1 illustrates a portable communication device capable of adjusting a zoom magnification according to an embodiment.

FIG. 1 illustrates a portable communication device capable of adjusting a zoom magnification according to an embodiment.

Referring to FIG. 1, in operation 101, in a preview mode, a portable communication device 100 may output, on a display 140, a preview image generated based on data obtained in an entire region of an image sensor included in a camera module 110. The camera module 110 may be exposed through a rear surface of the portable communication device 100, for example. For example, the portable communication device 100 may obtain data from the image sensor, bin at least a portion of the obtained data to generate first raw image data, and generate first image based on the first raw image data and output the generated first image on the display 140.

When an input associated with adjustment of zoom setting is received in operation 101, the portable communication device 100 may output, on the display 140, a preview image generated based on data obtained in the portion of the image sensor in operation 102. The input associated with the adjustment of the zoom setting may include, for example, a pinch-out input in which a space between two fingers, which touched the display 140 (e.g., touch screen display), is widened. For example, the portable communication device 100 may obtain the data from the portion of the image sensor, re-mosaic at least a portion of the obtained data to generate second raw image data, and generate second image based on the second raw image data and output the generated second image on the display 140. Additionally, or alternatively, the portable communication device 100 may store the generated image. For example, the portable communication device 100 may store the generated image in response to an input associated with image capturing.

Figure 2:
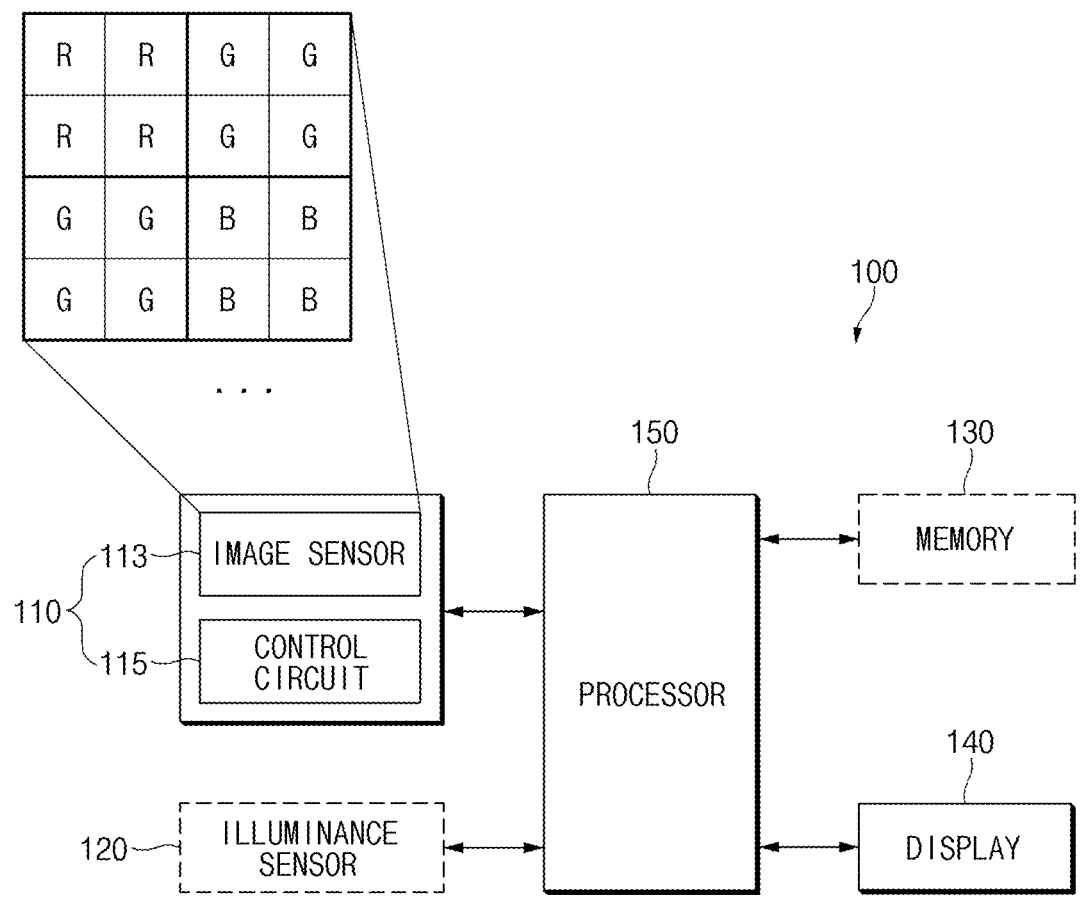
FIG. 2 illustrates a block diagram of a portable communication device according to an embodiment.

FIG. 2 illustrates a block diagram of a portable communication device according to an embodiment.

Referring to FIG. 2, according to one embodiment, the portable communication device 100 may include the camera module 110, the display 140, and a processor 150. In one embodiment, the portable communication device 100 may omit some components or further include additional components. For example, the portable communication device 100 may further include a memory 130. In one embodiment, some of components of the portable communication device 100 may be combined with each other as a single entity, but the single entity may perform the same functions of the corresponding components before the combination.

According to an embodiment, the camera module 110 may include an image sensor 113 including a plurality of image pixels and a control circuit 115 for controlling the image sensor 113. The image sensor 113 may include the plurality of image pixels formed in a multi-cell structure in which data for the specified number of image pixels corresponding to the same channel may be binned. For example, the plurality of image pixels may be included in a single channel on the N×N pixels basis. To this end, a plurality of ((M×M)/(N×N)) color filters may be arranged on the plurality of image pixels, and one color filter may be disposed on the N×N pixels. A case in which the N×N pixels are included in the single channel will be described as an example. The N×N pixels corresponding to the same channel may share an output node (e.g., a floating diffusion area). In the disclosure, a case in which the plurality of image pixels is included in the single channel on the 2×2 pixels basis will be described as an example. However, the disclosure is not limited thereto. For example, the plurality of image pixels may be included in the single channel on a matrix form of the 3×3, 4×4, or greater basis. The control circuit 115 may use the image sensor 113 to obtain image data from at least some of the plurality of image pixels, and process (e.g., bin, re-mosaic) the obtained image data to generate raw image data. For example, the control circuit 115 may adjust a timing of obtaining the image data from the plurality of image pixels to bin or not bin the image data.

According to one embodiment, the display 140 may display various contents (e.g., a text, an image, a video, an icon, and/or a symbol, or the like), for example. The display 140 may include, for example, a liquid crystal display (LCD), a light emitting diode (LED) display, an organic light emitting diode (OLED) display, or an electronic paper display. The display 140 may be, for example, a touch screen display capable of detecting a user's touch.

The processor 150 may execute operations or data processing associated with control and/or communication of at least one of other components of the portable communication device 100 using instructions stored in the memory 130. The processor 150 may include at least one of a graphic processing unit (GPU), an application processor, or an image processor.

According to one embodiment, when an input associated with activation of an image capturing function is received, the processor 150 may activate the image capturing function of the camera module 110. The input associated with the activation of the image capturing function may be, for example, a user's input of selecting (e.g., touching) an icon associated with the activation of the image capturing function. For example, the processor 150 may transmit a request associated with the activation of the image capturing function to the control circuit 115 such that driving power is supplied to the camera module 110 and the control circuit 115 activates the image capturing function of the image sensor 113.

According to one embodiment, when the image capturing function is activated, the processor 150 may use the image sensor 113 to obtain the first raw image data having a specified channel pattern, which is generated by binning the image data obtained from the first set number (or the specified number) of image pixels corresponding to the same channel with respect to the plurality of image pixels. The first set number may be the total number of the image pixels included in the single channel. The specified channel pattern may be a bayer channel pattern in which R image data and G image data alternately appear on odd row lines, and the G image data and B image data alternately appear on even row lines. For example, the processor 150 may use the control circuit 115 to control the image sensor 113 such that image data for the first set number of the image pixels corresponding to the same channel among the plurality of image pixels are binned and then read-out.

According to one embodiment, the processor 150 may display the first image generated based on the first raw image data on the display 140. For example, the processor 150 color-interpolates the first raw image data such that each pixel of the first raw image data includes all of R information, G information, and B information, and then converts the color-interpolated first raw image data into a specified format (e.g., a YUV format) to generate the first image data. The processor 150 may generate the first image based on the generated first image data and display the first image on the display 140.

According to one embodiment, the processor 150 may receive the input associated with the adjustment of the zoom setting while the image capturing function is activated. The input associated with the adjustment of the zoom setting is an input of requesting the adjustment of the zoom magnification, which may include a zoom in and a zoom out. For example, the input associated with the adjustment of the zoom setting may include a first input of widening the space between the two fingers, which touched the touch screen display 140. As another example, the input associated with the adjustment of the zoom setting may include a second input of selecting a first menu of setting a zoom region or a second menu of setting a zoom magnification. In the disclosure, an example in which the input associated with the adjustment of the zoom setting is the first input will be described as an example.

According to one embodiment, when the input associated with the adjustment of the zoom setting is received, the processor 150 may determine the zoom magnification based on the received input. For example, the processor 150 may determine the zoom magnification based on a change in the space between the two fingers touched the touch screen display 140. In this regard, when the space between the two touched fingers is widened, the processor 150 may increase the zoom magnification based on a degree of widening. Further, when the space between the two touched fingers is reduced, the processor 150 may decrease the zoom magnification based on a degree of reduction.

According to one embodiment, when the input associated with the adjustment of the zoom setting is received, the processor 150 may determine image pixels to be used for obtaining a zoomed image (some of the image pixels) among the plurality of image pixels based on the received input. For example, position information of the some of the image pixels mapped on a selected position (e.g., row information and column information of the some of the image pixels) may be stored in the memory 130. Further, as the processor 150 identifies the position information of the some of the image pixels corresponding to the selected position (e.g., a center position between the two fingers) from the memory 130, the processor 150 may determine the image pixels to be used for obtaining the zoomed image. The some of the image pixels mapped on the selected position may be different for each zoom magnification. For example, as the zoom magnification is higher, the total number of some of the image pixels may be smaller.

According to one embodiment, when it is identified that the zoom setting (or the zoom magnification) is within a specified first magnification range, the processor 150 may use the image sensor 113 to obtain the first raw image data generated by binning the image data obtained from the first set number of pixels corresponding to the same channel among the plurality of image pixels, and display the first image generated using the obtained first raw image data on the display 140. The first magnification range may be about 1 time, for example.

According to one embodiment, when it is identified that the zoom setting is within a specified second magnification range, the processor 150 may use the image sensor 113 to obtain the second raw image data generated by re-mosaicing the image data obtained from the some of the plurality of image pixels corresponding to a portion of the image sensor 113. The second magnification range may be, for example, N times corresponding to the number of horizontal image pixels or vertical image pixels included in the single channel. For example, when it is identified that the zoom magnification is within the second magnification range based on the input associated with the adjustment of the zoom setting, the processor 150 may identify the position information of the some of the image pixels based on the zoom magnification, which is mapped on the selected position based on the input. The processor 150 may use the image sensor 113 and the control circuit 115 to obtain the image data for the some of the image pixels, and use the control circuit 115 to re-mosaic the image data obtained from the some of the image pixels, thereby generating and obtaining the second raw image data having a specified channel pattern. The second raw image data may be image data having the same resolution as the first raw image data.

According to one embodiment, the processor 150 may obtain third raw image data instead of the second raw image data when the zoom setting is within the second magnification range, based on at least one of ambient illuminance or a signal to noise ratio (SNR) of the image. For example, when it is identified that the zoom setting is within the second magnification range, the processor 150 may identify the ambient illuminance using an illuminance sensor 120 and determine whether the ambient illuminance is within a specified illuminance range. The specified illuminance range may be an illuminance range of, for example, equal to or above a reference illuminance (e.g., about 50 lux) of determining whether the illuminance is low. When the ambient illuminance is within the specified illuminance range, the processor 150 may generate the above-described second raw image data. Further, when the ambient illuminance is not within the specified illuminance range, the processor 150 may use the image sensor 113 to obtain the third raw image data generated by at least binning image data obtained from the specified number of image pixels corresponding to the same channel among the some of the image pixels corresponding to the portion of the image sensor 113. As another example, when it is identified that the zoom setting is within the second magnification range, the processor 150 may identify a signal to noise ratio of the first raw image data and determine whether the signal to noise ratio is within a specified ratio range. The specified ratio range may be determined experimentally as a criterion for determining a deterioration of an image quality of the first raw image data. When the signal to noise ratio is within the specified ratio range, the processor 150 may use the image sensor 113 to obtain the above-described second raw image data. In various embodiments, the processor 150 may determine whether to obtain the second raw image data even after, based on the signal to noise ratio of the obtained second raw image data. When the signal to noise ratio is not within the specified ratio range, the processor 150 may use the image sensor 113 to obtain the third raw image data generated by binning the data obtained from the specified number of image pixels corresponding to the same channel among the some of the plurality of image pixels corresponding to the portion of the image sensor 113. As another example, when it is identified that the zoom setting is within the second magnification range, the processor 150 may determine whether the ambient illuminance is within the specified illuminance range and whether the signal to noise ratio of the first image is within the specified ratio range. When the ambient illuminance is within the specified illuminance range and the signal to noise ratio of the first image is within the specified ratio range, the processor 150 may use the image sensor 113 to obtain the above-described second raw image data. When the ambient illuminance is not within the specified illuminance range, or when the signal to noise ratio of the first image is not within the specified ratio range, the processor 150 may use the image sensor 113 to obtain the above-described third raw image data. The processor 150 may display the second image generated based on the second raw image data or the third image generated based on the third raw image data on the display 140. According to the embodiment described above, as the processor 150 displays a third image (a preview image) using the third raw image data generated by binning the image data for the some of the image pixels instead of the second raw image, the processor 150 may display a preview image having a higher image quality based on a surrounding situation or an image quality.

According to one embodiment, the processor 150 may store the preview image (one of the first to third images) in the memory 130. In addition, the processor 150 may store the image generated in response to the input associated with the image capturing in the memory 130.

According to various embodiments, when the ambient illuminance is not within the specified illuminance range or the signal to noise ratio of the image is not within the specified ratio range, the processor 150 may output a screen indicating that the adjustment of the zoom magnification is not available in response to the input associated with the adjustment of the zoom setting and not adjust the zoom magnification, or provide a digital zoom based on the first raw image data or the second raw image data.

According to various embodiments, based on the zoom setting being within a specified third magnification range, the processor 150 may use the image sensor 113 to obtain fourth raw image data in which image data obtained from pixels of the second set number, which is different from the first set number, corresponding to the same channel among the plurality of image pixels is at least binned. The second set number may be the number of some of the image pixels included in each channel. The third magnification range may include a magnification of greater than about 1 time and less than N times. For example, when the plurality of image pixels is included in a single channel on the 3×3 pixels basis, the second magnification range may include magnification of about 3 times, and the third magnification range may include magnification of about 2 times. Additionally or alternatively, the processor 150 may use the image sensor 113 to obtain the fourth raw image data, which is generated by binning the image data obtained from the second set number of pixels corresponding to the same channel with respect to some of the remaining image pixels among the plurality of image pixels and further re-mosaicing the binned image data. The processor 150 may display fourth image generated using the obtained fourth raw image data on the display 140.

According to the above embodiment, in the portable communication device 100, a resolution of the raw image data after the adjustment of the zoom setting (e.g., the second raw image data) may not be lowered compared to that of the raw image data before the adjustment of the zoom setting (e.g., the first raw image data) through the binning or the re-mosaicing of the image data for the plurality of image pixels of the image sensor 113.

According to one embodiment, a portable communication device (e.g., the portable communication device 100 of FIG. 2) may include a camera module (the camera module 110 of FIG. 2) including an image sensor (e.g., the image sensor 113 of FIG. 2) including a plurality of image pixels and a control circuit (e.g., the control circuit 115 of FIG. 2) for controlling the image sensor; a display (e.g., the display 140 of FIG. 2); and a processor (e.g., the processor 150 of FIG. 2). The processor may activate an image capturing function of the camera module, when the image capturing function is activated, use the image sensor to obtain first raw image data having a specified channel pattern, which is generated by binning image data obtained from the specified number of image pixels corresponding to the same channel with respect to the plurality of image pixels, display a first image generated based on the first raw image data on the display, receive an input associated with adjustment of zoom setting while the image capturing function is activated, use the image sensor to obtain second raw image data having the specified channel pattern, which is generated by re-mosaicing image data obtained from some of the plurality of image pixels corresponding to a portion of the image sensor, based at least on the input, and display a second image generated based on the second raw image data on the display.

The processor may identify a position selected as a zoom region and zoom magnification based at least on the input associated with the adjustment of the zoom setting, and the some of the image pixels may be image pixels corresponding to the identified zoom magnification, mapped on the selected position.

The second raw image data may be raw image data generated to have a resolution corresponding to a resolution of the first raw image data.

The processor may identify an ambient illuminance and obtain the second raw image data using the image sensor when the ambient illuminance is within a specified illuminance range.

When the ambient illuminance is not within the specified illuminance range, the processor may use the image sensor to obtain third raw image data generated by at least binning the image data obtained from the specified number of image pixels corresponding to the same channel among the some of the plurality of image pixels corresponding to the portion of the image sensor, and display third image generated based on the third raw image data on the display.

The processor may identify a signal to noise ratio of the first image and, when the signal to noise ratio of the first image is within a specified ratio range, obtain the second raw image data using the image sensor.

When the signal to noise ratio is not within the specified ratio range, the processor may use the image sensor to obtain the third raw image data generated by binning the data obtained from the specified number of image pixels corresponding to the same channel among the some of the plurality of image pixels corresponding to the portion of the image sensor, and display the third image generated based on the third raw image data on the display.

According to one embodiment, a portable communication device (e.g., the portable communication device 100 of FIG. 2) may include a camera module (the camera module 110 of FIG. 2) including an image sensor (e.g., the image sensor 113 of FIG. 2) including a plurality of image pixels and a control circuit (e.g., the control circuit 115 of FIG. 2) for controlling the image sensor; a display (e.g., the display 140 of FIG. 2); and a processor (e.g., the processor 150 of FIG. 2). The processor may receive an input associated with adjustment of zoom setting associated with capturing, use the image sensor to obtain first raw image data generated by binning image data obtained from the first set number of pixels corresponding to the same channel with respect to the plurality of image pixels based on the zoom setting being within a specified first magnification range, display a first image generated using the obtained first raw image data on the display, use the image sensor to obtain second raw image data generated by re-mosaicing image data obtained from some of the plurality of image pixels corresponding to a portion of the image sensor based on the zoom setting being within a specified second magnification range, and display a second image generated using the obtained second raw image data on the display.

Based on the zoom setting being within a specified third magnification range, the processor may use the image sensor to obtain third raw image data in which image data obtained from pixels of the second set number, which is different from the first set number, corresponding to the same channel is at least binned with respect to the plurality of image pixels, and display a third image generated using the obtained third raw image data on the display.

The processor may use the image sensor to obtain the third raw image data, which is generated by binning the image data obtained from the second set number of pixels corresponding to the same channel with respect to the plurality of image pixels and then further re-mosaicing the binned image data.

Based on the zoom setting being within the specified third magnification range, the processor may use the image sensor to obtain the third raw image data in which the image data obtained from the second set number of pixels corresponding to the same channel among some of the remaining image pixels corresponding to a remaining portion of the image sensor among the plurality of image pixels is at least binned.

The processor may identify information associated with a position and a magnification of a zoom region based on the input associated with the adjustment of the zoom setting, and the portion of the image sensor may be a portion corresponding to the position and the magnification of the zoom region.

The processor may identify ambient illuminance, when the ambient illuminance is within a specified illuminance range, use the image sensor to obtain the second raw image data having the specified channel pattern, which is generated by re-mosaicing the image data obtained from the some of the plurality of image pixels corresponding to the portion of the image sensor, when the ambient illuminance is not within the specified illuminance range, use the image sensor to obtain the third raw image data generated by binning the image data obtained from the specified number of image pixels corresponding to the same channel among the some of the plurality of image pixels corresponding to the portion of the image sensor, and display the third image generated based on the third raw image data on the display.

Figure 3A:
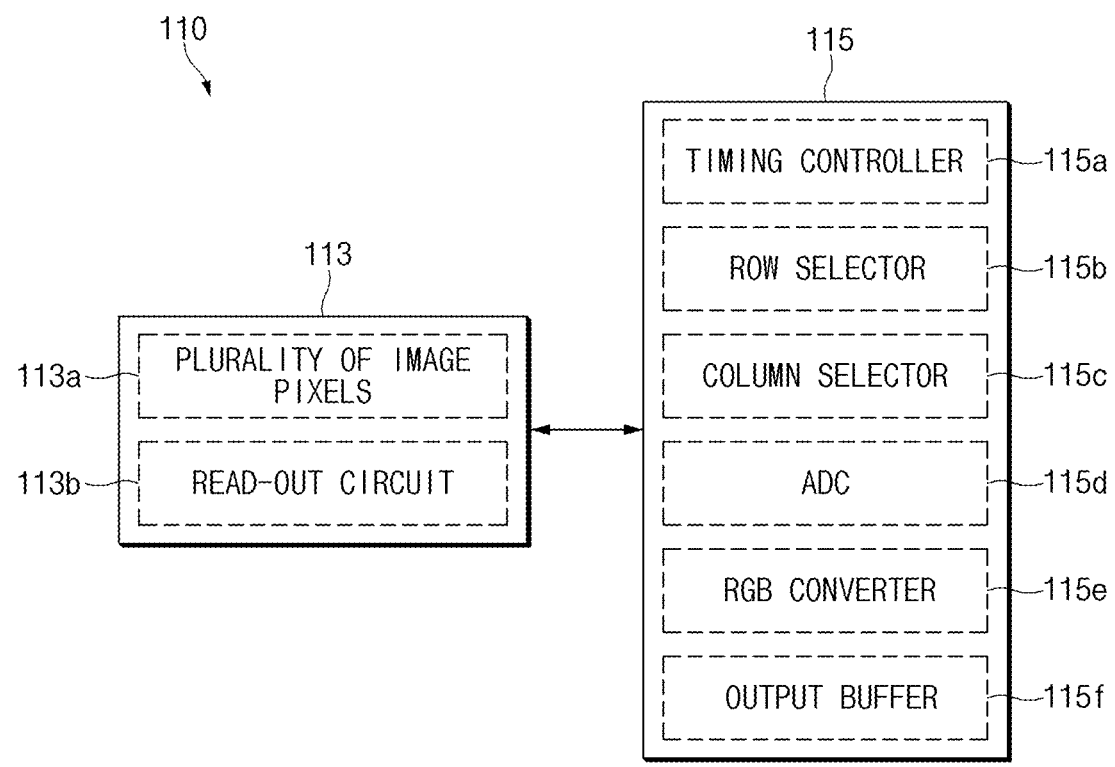
FIG. 3A illustrates a configuration diagram of a camera module according to an embodiment.

The processor may identify a signal to noise ratio of the first image, when the signal to noise ratio is within a specified ratio range, use the image sensor to obtain the second raw image data having the specified channel pattern, which is generated by re-mosaicing the image data obtained from the some of the plurality of image pixels corresponding to the portion of the image sensor, when the signal to noise ratio is not within the specified ratio range, use the image sensor to obtain the third raw image data generated by binning the data obtained from the specified number of image pixels corresponding to the same channel among some of the plurality of image pixels corresponding to the portion of the image sensor, and display the third image generated based on the third raw image data on the display. FIG. 3A illustrates a configuration diagram of a camera module according to an embodiment.

Referring to FIG. 3A, the camera module 110 may include the image sensor 113 and the control circuit 115. In one embodiment, the camera module 110 may omit some components or further include additional components. In one embodiment, some of components of the camera module 110 may be combined with each other as a single entity, but the single entity may perform the same functions of the corresponding components before the combination.

According to one embodiment, the image sensor 113 may include a plurality of image pixels 113a and a read-out circuit 113b. A charged coupled device (CCD) sensor or a complementary metal oxide semiconductor (CMOS) sensor may be included. A plurality of image pixels arranged in an M×M matrix may be formed in a single channel on the N×N pixels basis. To this end, a plurality ((M×M)/(N×N)) of color filters are arranged on the plurality of image pixels, and a single color filter may be disposed on the N×N pixels. For example, 16 (=64/4) color filters (R color filter, G color filter, or B color filter) are arranged on a plurality of image pixels arranged in an 8×8 matrix. Each of the 16 (=64/4) color filters may be disposed to have a specified channel pattern on 2×2 pixels. The N×N pixels included in the same channel may be formed in a multi-cell structure capable of binning image data for at least some pixels. For example, the N×N pixels corresponding to the same channel may share an output node (e.g., a floating diffusion area).

According to one embodiment, the control circuit 115 includes a timing controller 115a, a row selector 115b, a column selector 115c, an analog digital convertor (ADC) 115d, an RGB converter 115e, and an output buffer 115f. The timing controller 115a may generate a control signal for controlling an operation of at least one of the row selector 115b, the column selector 115c, the ADC 115d, the RGB converter 115e, and the output buffer 115f. The row selector 115b may selectively activate one of row lines of the image sensor 113 based on the control signal of the timing controller 115a. The column selector 115c may selectively activate one of column lines of the image sensor 113 based on the control signal of the timing controller 115a. The ADC 115d may convert analog image data output from the image sensor 113 into digital image data. The RGB converter 115e may re-mosaic digital image data to correspond to a specified channel pattern, thereby generating the raw image data having the specified channel pattern. The specified channel pattern may be the bayer channel pattern in which the R image data and the G image data alternately appear on the odd row lines, and the G image data and the B image data alternately appear on the even row lines. The output buffer 115f may buffer the raw image data, for example, on a frame basis in the re-mosaic process. The control circuit 115 to be described in a following document represents the timing controller 115a and each component controlled by the timing controller 115a.

According to one embodiment, when receiving a request associated with the activation of the image capturing function from an external processor (e.g., the processor 150 of FIG. 2), the control circuit 115 may activate the image capturing function of the image sensor 113. For example, the timing controller 115a may supply the driving power to the image sensor 113 to activate the image capturing function of the image sensor 113.

According to one embodiment, when the image capturing function of the image sensor 113 is activated, the control circuit 115 may use the image sensor 113 to generate first raw image data having a specified channel pattern by binning image data obtained from the first set number of image pixels corresponding to the same channel with respect to the plurality of image pixels. The first set number may be, for example, the total number of image pixels included in the same channel. For example, the timing controller 115a may control the row selector 115b and the column selector 115c to transmit the image data for the first set number of image pixels individually (or simultaneously) to a floating diffusion area, and use the read-out circuit 113b to read-out the floating diffusion area after all of the image data (charges) for the first set number of image pixels are transmitted to the floating diffusion area, thereby binning (e.g., summing up) the image data for the first set number of image pixels. The timing controller 115a may digitally convert the binned analog image data using the ADC 115d and buffer the digital data on a frame basis using the output buffer 115f to generate the first raw image data.

According to one embodiment, the control circuit 115 may receive a request associated with zoom setting from the processor 150 while the image capturing function is activated. When the request associated with the zoom setting is received, the control circuit 115 may identify some of the plurality of image pixels to read-out the image data based on the request. The control circuit 115 may obtain image data for the identified some of the image pixels, and re-mosaic the obtained image data to generate second raw image data having a specified channel pattern. The second raw image data may be image data having the same resolution as the first raw image data or image data having a resolution higher than that of the first raw image data. For example, the timing controller 115a may use the row selector 115b and the column selector 115c to read-out each of the analog image data for the some of the image pixels of the image sensor 113, and use the ADC 115d to digitally convert each of the read-out analog image data. The timing controller 115a may use the RGB converter 115e to re-mosaic the (digital) image data for the some of the image pixels based on the specified channel pattern, and buffer the re-mosaiced image data on a frame basis using the output buffer 115f, thereby generating the second raw image data having the specified channel pattern.

According to one embodiment, the control circuit 115 may transmit the first raw image data or the second raw image data obtained using the image sensor 113 to the processor 150. For example, the timing controller 115a may transmit the first raw image data or the second raw image data buffered on a frame basis by the output buffer 115f to the processor 150.

According to various embodiments, the control circuit 115 may generate third raw image data by binning an image obtained from the second set number of image pixels corresponding to the same channel among the some of the image pixels based on zoom magnification and then re-mosaicing the binned image. For example, the control circuit 115 may generate the third raw image data having the specified channel pattern by binning the image data obtained from the second set number of image pixels corresponding to the same channel with respect to some of the remaining image pixels among the plurality of image pixels based on zoom magnification being within a third magnification range, and re-mosaic the binned image data. The second set number may be smaller than the total number of image pixels included in the same channel. As another example, the timing controller 115a may use the image sensor 113 to individually (or simultaneously) transmit, to a floating diffusion area, the image data for the second set number of image pixels included in the same channel among the some of the remaining image pixels, and use the read-out circuit 113*b* to read-out the floating diffusion area after the image data (charges) for the second set number of image pixels are transmitted to the floating diffusion area, thereby binning (e.g., summing up) the image data for the second set number of image pixels. The timing controller 115*a* may use the ADC 115*d* to digitally convert each of the read-out analog image data. The timing controller 115*a* may use the RGB converter 115*e* to re-mosaic the (digital) image data for the some of the remaining image pixels based on a specified channel pattern, and use the output buffer 115*f* to buffer the re-mosaiced image data on a frame basis, thereby generating the third raw image data having the specified channel pattern.

According to various embodiments, each channel may include the N×K (K is a natural number different from N) number of image pixels.

Figure 3B:
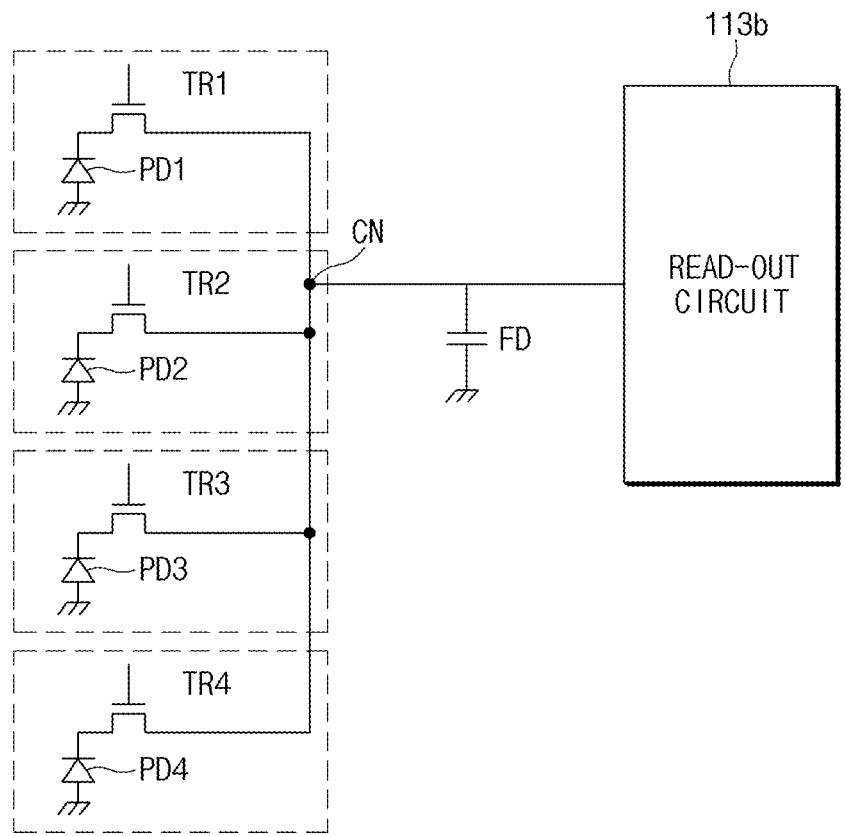
FIG. 3B illustrates image pixels included in a single channel according to an embodiment.

FIG. 3B illustrates image pixels included in a single channel according to an embodiment.

Referring to FIG. 3B, each of image pixels PD1, PD2, PD3, and PD4 113*a* may be a photodiode capable of accumulating light received after being reflected on an external object. A first end of each of the image pixels PD1, PD2, PD3, and PD4 may be connected to the ground. Further, second ends of the image pixels PD1, PD2, PD3, and PD4 may be electrically connected to transfer transistors TR1, TR2, TR3, and TR4, respectively.

First ends of the transfer transistors (e.g., TR1) may be connected to the image pixels (e.g., PD1), respectively. Further, second ends of the transfer transistors (e.g., TR1) may be connected to a common node (output node) CN. The image pixels PD1, PD2, PD3, and PD4 included in the same channel may pass through the common node CN and share a floating diffusion area FD. The floating diffusion area FD may be electrically connected to the common node CN to accumulate electric charges output to the common node CN therein. The transfer transistors TR1, TR2, TR3, and TR4 may sequentially and respectively output electric charges stored in the image pixels to the common node CN.

For example, when the zoom magnification is within the first magnification range, the read-out circuit (e.g., the read-out circuit 113*b* of FIG. 3A) may transfer the electric charges (binned image data) accumulated in the floating diffusion area FD to the control circuit 115 after all electric charges accumulated in all image pixels (of the first set number) included in the same channel are transferred to the common node CN. Alternatively, for example, when the zoom magnification is within the second magnification range, the read-out circuit 113*b* may transfer the electric charges accumulated in the floating diffusion area FD to the control circuit 115 after an electric charge accumulated in one image pixel is transferred to the common node CN and before an electric charge accumulated in another image pixel is transferred to the common node CN. Further, for example, when the zoom magnification is within the third magnification range, the read-out circuit 113*b* may transfer the electric charges accumulated in the floating diffusion area FD to the control circuit 115 when electric charges accumulated in the second set number of image pixels among the image pixels included in each channel are transferred to the common node CN.

According to one embodiment, a camera module (the camera module 110 of FIG. 3A) includes an image sensor (e.g., the image sensor 113 of FIG. 3A) including a plurality of image pixels (e.g., the plurality of image pixels 113*a* of FIG. 3A) and a control circuit (e.g., the control circuit 115 of FIG. 3A) for controlling the image sensor. The control circuit may activate an image capturing function of the image sensor, when the image capturing function is activated, use the image sensor to generate first raw image data having a specified channel pattern, which is generated by binning image data obtained from the specified number of image pixels corresponding to the same channel with respect to the plurality of image pixels, transmit the generated first raw image data to an external processor (e.g., the processor 150 of FIG. 2) electrically connected to the control circuit, receive a request associated with zoom setting while the image capturing function is activated, use the image sensor to generate second raw image data having the specified channel pattern by re-mosaicing image data for some of the plurality of image pixels corresponding to a portion of the image sensor based at least on the request, and transmit the generated second raw image data to the external processor.

The control circuit may generate the first raw image data or the second raw image data based on a specified resolution.

The control circuit may identify position information of the some of the image pixels based on the request associated with the zoom setting and obtain image data from the some of the image pixels corresponding to the identified position information.

The control circuit may identify information associated with zoom magnification based on the request associated with the zoom setting, generate second raw image data having the specified channel pattern by re-mosaicing image data for some of the plurality of image pixels corresponding to a portion of the image sensor based on the zoom magnification being within a first magnification range, transmit the second raw image data to the external processor, generate third raw image data having the specified channel pattern by binning image data obtained from image pixels of the different specified number corresponding to the same channel with respect to some of the remaining image pixels based on the zoom magnification being within a second magnification range, and then re-mosaicing the image data, and transmit the third raw image data to the external processor.

The plurality of image pixels may include N×N image pixels included in each channel. N is a natural number equal to or greater than 2. Further, the specified number may be the total number of image pixels included in each channel, and the different specified number may be the number of some of the total image pixels included in each channel.

Figure 4:
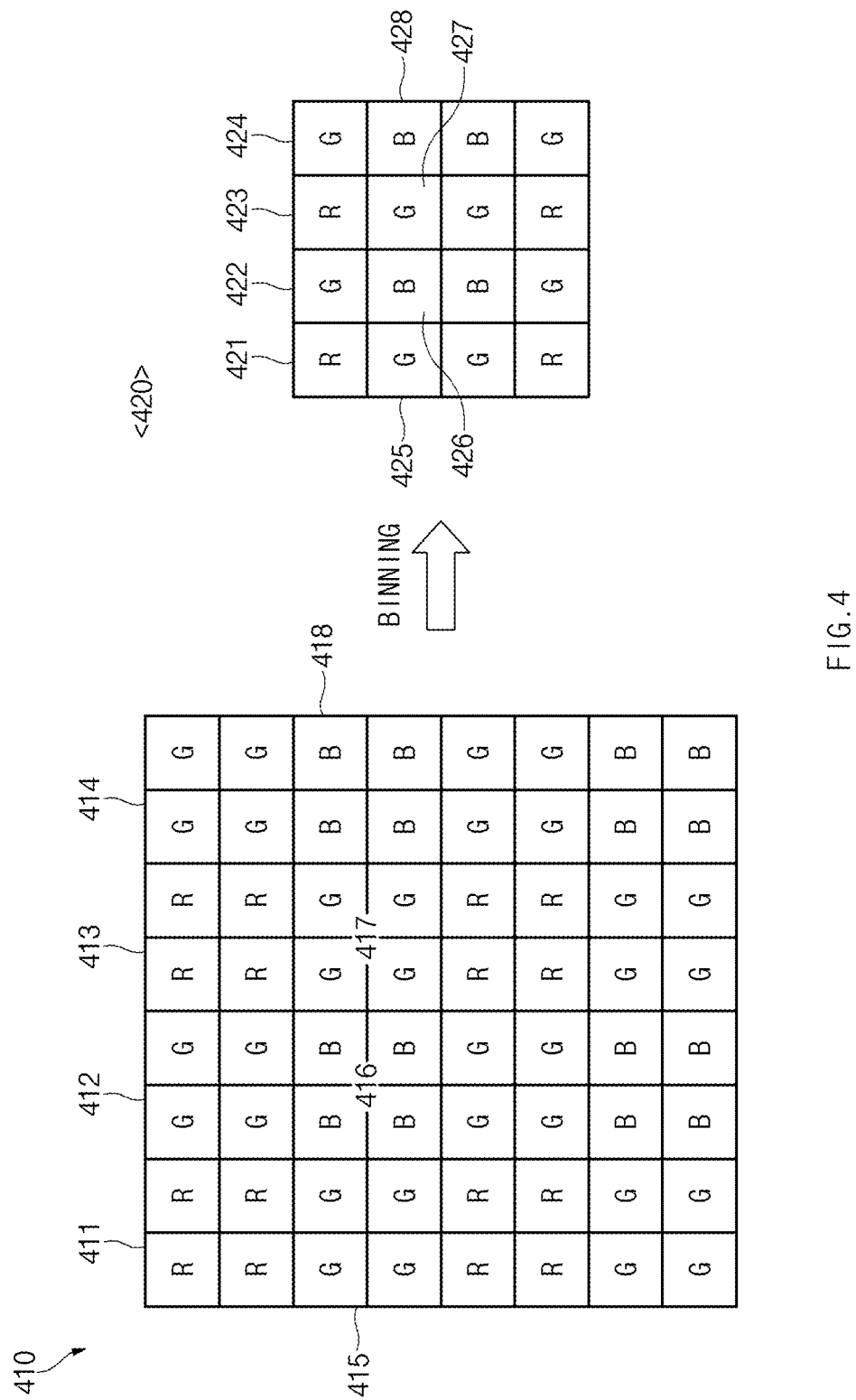
FIG. 4 illustrates a process of generating first raw image data according to an embodiment.

FIG. 4 illustrates a process of generating first raw image data according to an embodiment.

Referring to FIG. 4, an image sensor (e.g., the image sensor 113 of FIG. 3A) may include a plurality of image pixels (e.g., 113*a* of FIG. 3A) arranged in an 8×8 matrix. The plurality of image pixels 113*a* may be included in a single channel (e.g., 411) on the 2×2 pixels basis. For example, one color filter (R color filter, G color filter, or B color filter) may be disposed on the 2×2 pixels.

According to one embodiment, the control circuit 115 may generate first raw image data 420 having a specified channel pattern by binning image pixels included in the same channel with respect to the plurality of image pixels based on a command (e.g., a request associated with activation of the image sensor) of the processor 150. For example, the control circuit 115 may bin image data obtained from four image pixels corresponding to a R channel 411 to generate one R image data 421, and bin image data obtained from 4 image pixels corresponding to a G channel 412 to generate one G image data 422. The control circuit 115 may bin image data obtained from four image pixels corresponding to a R channel 413 to generate one R image data 423, and bin image data obtained from 4 image pixels corresponding to a G channel 414 to generate one G image data 424. The control circuit 115 may bin image data obtained from four image pixels corresponding to a G channel 415 to generate one G image data 425, and bin image data obtained from 4 image pixels corresponding to a B channel 416 to generate one B image data 426. The control circuit 115 may bin image data obtained from four image pixels corresponding to a G channel 417 to generate one G image data 427, and bin image data obtained from 4 image pixels corresponding to a B channel 418 to generate one B image data 428. Similarly, the control circuit 115 may bin image data for four image pixels corresponding to the same channel for the remaining channels, and as a result, the image sensor 113 may generate the first raw image data 420 having the specified channel pattern. The specified channel pattern may be a bayer channel pattern in which R image data and the G image data alternately appear on odd row lines, and the G image data and the B image data alternately appear on even row lines.

Figure 5:
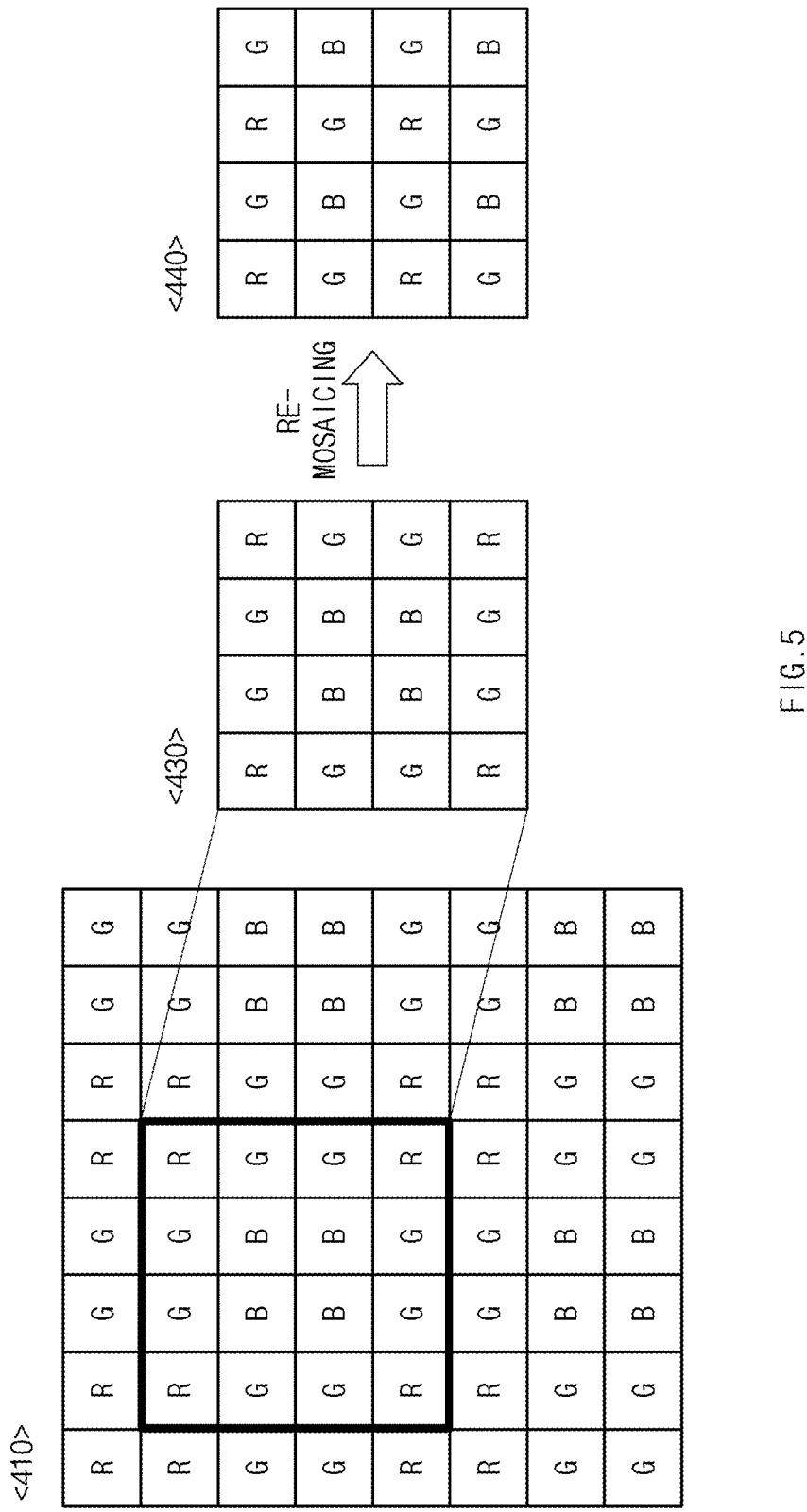
FIG. 5 illustrates a process of generating second raw image data according to an embodiment.

FIG. 5 illustrates a process of generating second raw image data according to an embodiment.

Referring to FIG. 5, the control circuit 115 may generate second raw image data 440 having the specified channel pattern by re-mosaicing image data 430 for some of the plurality of image pixels corresponding to a portion of the image sensor 113 based on a command (e.g., a request associated with zoom setting) of the processor 150 while the image capturing function is activated. For example, the control circuit 115 may identify position information of the some of the image pixels based on the request associated with the zoom setting, and obtain the image data 430 from the some of the image pixels based on the identified position information. As the control circuit 115 performs re-mosaic of exchanging image data that do not correspond to the specified channel pattern among the image data 430 obtained from the image sensor 113 with each other, the control circuit 115 may generate the second raw image data 440 having the specified channel pattern.

Referring to FIGS. 4 and 5, according to the above-described embodiment, the first raw image data 420 and the second raw image data 440 may have the same resolution.

Figure 6:
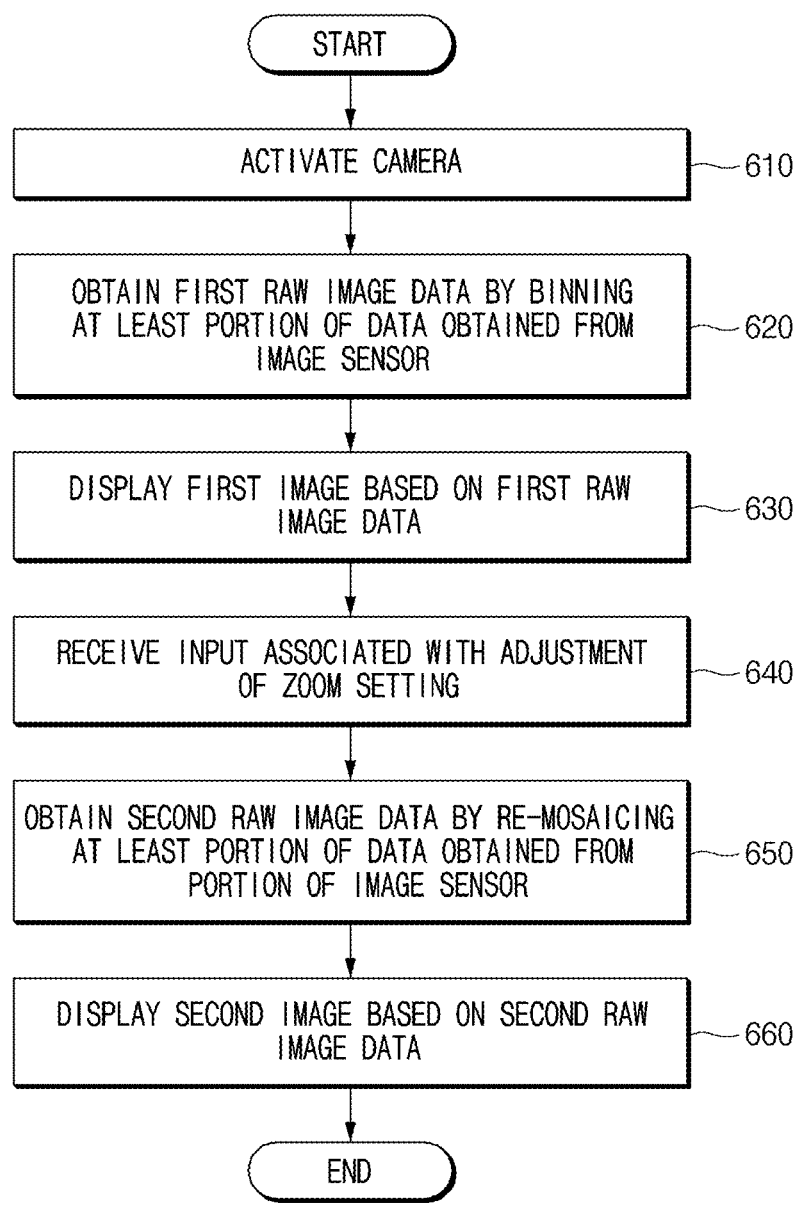
FIG. 6 illustrates an example of a method for controlling an image sensor by a processor according to an embodiment.

FIG. 6 illustrates an example of a method for controlling an image sensor by a processor (e.g., the processor 150 of FIG. 2) according to an embodiment.

Referring to FIG. 6, in operation 610, the processor 150 may activate the image capturing function of the camera module 110. For example, when the input associated with the activation of the image capturing function is received, the processor 150 may activate the image capturing function of the camera module 110. The input associated with the activation of the image capturing function may be, for example, the user's input of selecting (e.g., touching) the icon associated with the activation of the image capturing function.

In operation 620, when the image capturing function is activated, the processor 150 may use the image sensor 113 to obtain the first raw image data having the specified channel pattern, which is generated by binning the image data obtained from the specified number (the first set number) of image pixels corresponding to the same channel with respect to the plurality of image pixels. The specified number may be, for example, the total number of image pixels included in each channel. The specified channel pattern may be the bayer channel pattern.

In operation 630, the processor 150 may display the first image generated based on the first raw image data on the display 140. For example, the processor 150 may color-interpolate the first raw image data such that each pixel of the first raw image data includes the R information, the G information, and the B information, and generate the first image by converting the color-interpolated first raw image data into the specified format (e.g., YUV format).

In operation 640, the processor 150 may receive the input associated with the adjustment of the zoom setting while the image capturing function is activated. For example, the input associated with the adjustment of the zoom setting may include the first input of widening the space between the two fingers, which touched the touch screen display 140.

In operation 650, the processor 150 may use the image sensor 113 to obtain the second raw image data having the specified channel pattern, which is generated by re-mosaicing the image data obtained from the some of the plurality of image pixels corresponding to the portion of the image sensor 113 based at least on the input. For example, the processor 150 may identify the selected position and the zoom magnification based on the input associated with the adjustment of the zoom setting, and identify the position information of the some of the image pixels corresponding to the zoom magnification mapped on the selected position. The processor 150 may use the image sensor 113 to obtain the image data of the some of the image pixels of the identified position information, and use the control circuit 115 to re-mosaic the obtained image data to correspond to the specified channel pattern, thereby obtaining the second raw image data.

In operation 660, the processor 150 may display the second image generated based on the second raw image data on the display 140. For example, the processor 150 may color-interpolate the second raw image data such that each pixel of the second raw image data includes the R information, the G information, and the B information, and generate the second image by converting the color-interpolated second raw image data into the specified format (e.g., YUV format).

Figure 7:
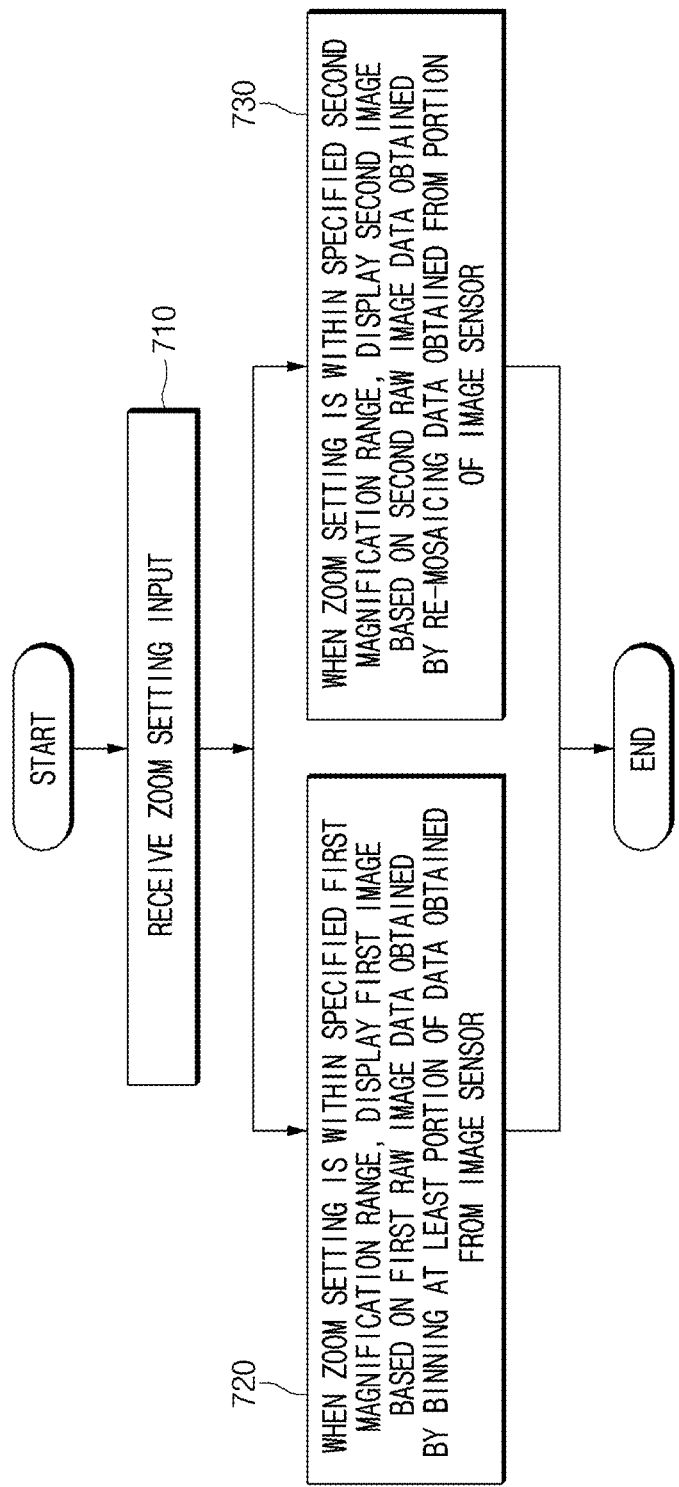
FIG. 7 illustrates an example of a method for controlling an image sensor by a processor according to an embodiment.

FIG. 7 illustrates another example of a method for controlling an image sensor by the processor 150 according to an embodiment.

In operation 710, the processor 150 may receive the input associated with the adjustment of the zoom setting associating with the capturing. For example, the processor 150 may receive the input associated with the adjustment of the zoom setting while the image capturing function of the camera module 110 is activated. The input associated with the adjustment of the zoom setting may be, for example, the input of requesting the adjustment of the zoom magnification (e.g., zoom in or zoom out).

In operation 720, the processor 150 may use the image sensor 113 to obtain the first raw image data generated by binning the image data obtained from the first set number of pixels corresponding to the same channel with respect to the plurality of image pixels based on the zoom setting being within the specified first magnification range. The processor 150 may display the first image generated using the obtained first raw image data on the display 140. The first set number may be the total number of image pixels corresponding to the same channel. The first magnification range may be about 1 time, for example.

In operation 730, the processor 150 may use the image sensor 113 to obtain the second raw image data generated by re-mosaicing the image data obtained from the some of the plurality of image pixels corresponding to the portion of the image sensor 113 based on the zoom setting being within the specified second magnification range. The processor 150 may display the second image generated using the obtained second raw image data on the display 140. For example, the second magnification range may be, for example, a multiple corresponding to the number of horizontal image pixels N or the number of vertical image pixels N included in each channel. For example, the processor 150 may identify the selected position and the zoom magnification based on the input associated with the adjustment of the zoom setting, and identify the position information of the some of the image pixels corresponding to the zoom magnification mapped on the selected position. The processor 150 may use the image sensor 113 to obtain the image data of the some of the image pixels of the identified position information, and use the control circuit 115 to re-mosaic the obtained image data to correspond to the specified channel pattern, thereby obtaining the second raw image data. The second raw image data may be image data having the same resolution as the first raw image data.

According to various embodiments, in operation 730, when the zoom setting is within the specified second magnification range, the processor 150 may use the image sensor 113 to re-mosaic the image data obtained from the plurality of image pixels to obtain the raw image data, select the raw image data corresponding to the portion of the image sensor 113 from the obtained raw image data, and use the selected image data to generate the second image.

Figure 8:
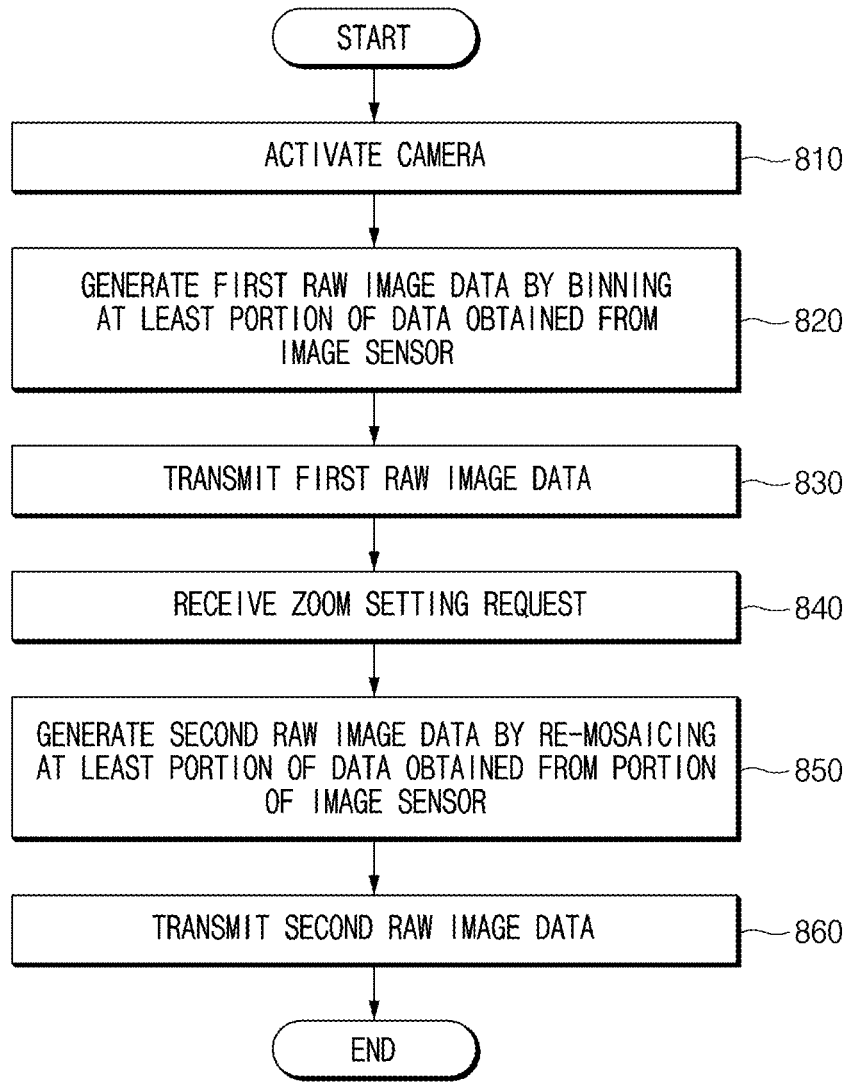
FIG. 8 illustrates a method for controlling an image sensor by a control circuit according to an embodiment.

FIG. 8 illustrates a method for controlling an image sensor by the control circuit 115 according to an embodiment.

In operation 810, the control circuit (e.g., the control circuit 115 of FIG. 2) may activate the image capturing function of the image sensor 113. When the request associated with the activation of the image capturing function is received from the processor 150, the control circuit 115 may activate the image capturing function of the image sensor 113.

In operation 820, when the image capturing function is activated, the control circuit 115 may use the image sensor 113 to generate the first raw image data having the specified channel pattern, which is generated by binning the image data obtained from the specified number of image pixels corresponding to the same channel with respect to the plurality of image pixels. The specified number may be, for example, the total number of image pixels corresponding to the same channel. The specified channel pattern may be the bayer channel pattern.

In operation 830, the control circuit 115 may transmit the first raw image data to the external processor (e.g., the processor 150 of FIG. 2) electrically connected to the control circuit.

In operation 840, the control circuit 115 may receive the request associated with the zoom setting while the image capturing function is activated.

In operation 850, the control circuit 115 may use the image sensor 113 to re-mosaic the image data for the some of the plurality of image pixels corresponding to the portion of the image sensor based at least on the request, thereby generating the second raw image data having the specified channel pattern. The second raw image data may have the same resolution as the first raw image data.

In operation 860, the control circuit 115 may transmit the generated second raw image data to the external processor 150.

Figure 9:
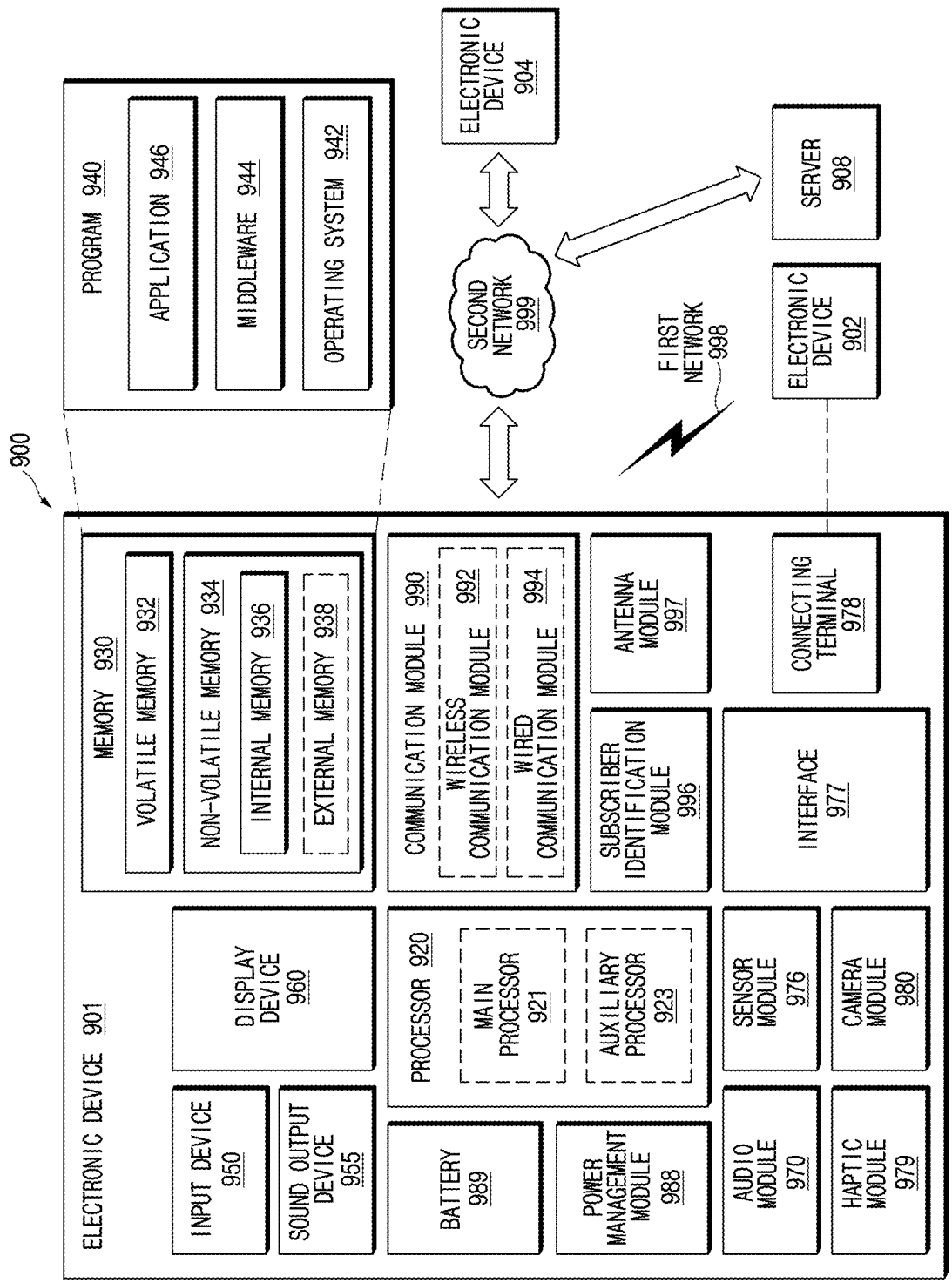
FIG. 9 illustrates a block diagram of an electronic device in a network environment according to various embodiments.

FIG. 9 illustrates a block diagram of an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 (e.g., the communication device 100 of FIG. 2) may include a processor 920, memory 930 (e.g., the memory 130 of FIG. 2), an input device 950, a sound output device 955, a display device 960 (e.g., the display 140 of FIG. 2), an audio module 970, a sensor module 976 (e.g., the illuminance sensor 120 of FIG. 2), an interface 977, a haptic module 979, a camera module 980 (e.g., the camera module 110 of FIG. 2), a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

Figure 10:
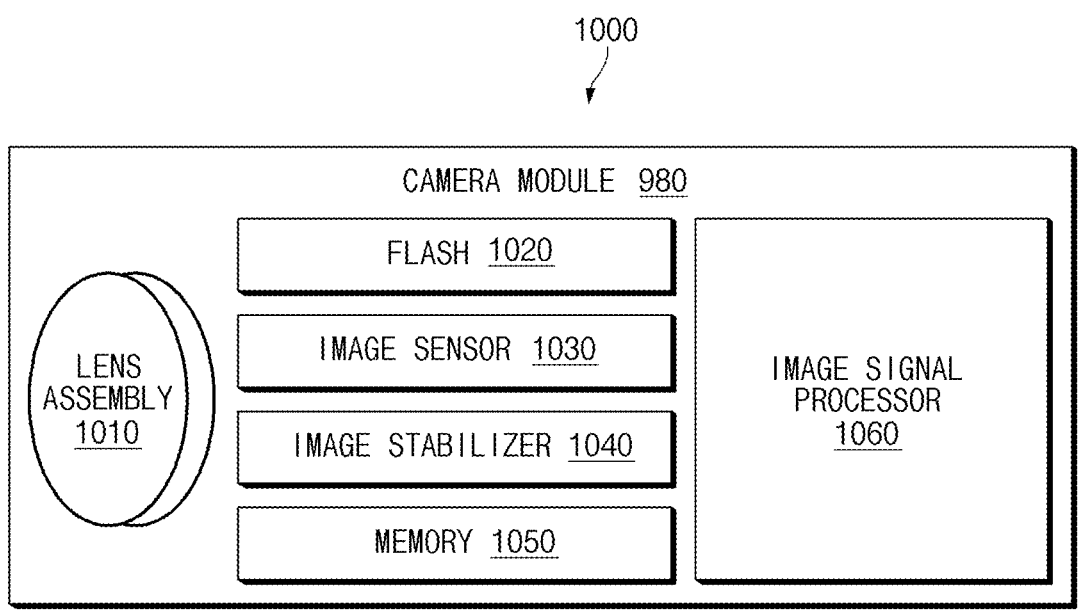
FIG. 10 illustrates a block diagram 1000 of the camera module according to various embodiments.

FIG. 10 illustrates a block diagram 1000 of the camera module 980 according to various embodiments. Referring to FIG. 10, the camera module 980 may include a lens assembly 1010, a flash 1020, an image sensor 1030 (e.g., the control circuit 115 and the image sensor 113 of FIG. 2), an image stabilizer 1040, memory 1050 (e.g., buffer memory), or an image signal processor 1060 (e.g., the processor 150 of FIG. 2). The lens assembly 1010 may collect light emitted or reflected from an object whose image is to be taken. The lens assembly 1010 may include one or more lenses. According to an embodiment, the camera module 980 may include a plurality of lens assemblies 1010. In such a case, the camera module 980 may form, for example, a dual camera, a 360-degree camera, or a spherical camera. Some of the plurality of lens assemblies 1010 may have the same lens attribute (e.g., view angle, focal length, auto-focusing, f number, or optical zoom), or at least one lens assembly may have one or more lens attributes different from those of another lens assembly. The lens assembly 1010 may include, for example, a wide-angle lens or a telephoto lens.

The flash 1020 may emit light that is used to reinforce light reflected from an object. According to an embodiment, the flash 1020 may include one or more light emitting diodes (LEDs) (e.g., a red-green-blue (RGB) LED, a white LED, an infrared (IR) LED, or an ultraviolet (UV) LED) or a xenon lamp. The image sensor 1030 may obtain an image corresponding to an object by converting light emitted or reflected from the object and transmitted via the lens assembly 1010 into an electrical signal. According to an embodiment, the image sensor 1030 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 1030 may be implemented using, for example, a charged coupled device (CCD) sensor or a complementary metal oxide semiconductor (CMOS) sensor.

The image stabilizer 1040 may move the image sensor 1030 or at least one lens included in the lens assembly 1010 in a particular direction, or control an operational attribute (e.g., adjust the read-out timing) of the image sensor 1030 in response to the movement of the camera module 980 or the electronic device 901 including the camera module 980. This allows compensating for at least part of a negative effect (e.g., image blurring) by the movement on an image being captured. According to an embodiment, the image stabilizer 1040 may sense such a movement by the camera module 980 or the electronic device 901 using a gyro sensor (not shown) or an acceleration sensor (not shown) disposed inside or outside the camera module 980. According to an embodiment, the image stabilizer 1040 may be implemented, for example, as an optical image stabilizer.

The memory 1050 may store, at least temporarily, at least part of an image obtained via the image sensor 1030 for a subsequent image processing task. For example, if image capturing is delayed due to shutter lag or multiple images are quickly captured, a raw image obtained (e.g., a Bayer-patterned image, a high-resolution image) may be stored in the memory 1050, and its corresponding copy image (e.g., a low-resolution image) may be previewed via the display device 960. Thereafter, if a specified condition is met (e.g., by a user's input or system command), at least part of the raw image stored in the memory 1050 may be obtained and processed, for example, by the image signal processor 1060. According to an embodiment, the memory 1050 may be configured as at least part of the memory 930 or as a separate memory that is operated independently from the memory 930.

The image signal processor 1060 may perform one or more image processing with respect to an image obtained via the image sensor 1030 or an image stored in the memory 1050. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 1060 may perform control (e.g., exposure time control or read-out timing control) with respect to at least one (e.g., the image sensor 1030) of the components included in the camera module 980. An image processed by the image signal processor 1060 may be stored back in the memory 1050 for further processing, or may be provided to an external component (e.g., the memory 930, the display device 960, the electronic device 902, the electronic device 904, or the server 908) outside the camera module 980. According to an embodiment, the image signal processor 1060 may be configured as at least part of the processor 920, or as a separate processor that is operated independently from the processor 920. If the image signal processor 1060 is configured as a separate processor from the processor 920, at least one image processed by the image signal processor 1060 may be displayed, by the processor 920, via the display device 960 as it is or after being further processed.

According to an embodiment, the electronic device 901 may include a plurality of camera modules 980 having different attributes or functions. In such a case, at least one of the plurality of camera modules 980 may form, for example, a wide-angle camera and at least another of the plurality of camera modules 980 may form a telephoto camera. Similarly, at least one of the plurality of camera modules 980 may form, for example, a front camera and at least another of the plurality of camera modules 980 may form a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the disclosure, the resolution degradation of the image data due to the zoom setting may be lowered. In addition, various effects that are directly or indirectly grasped through the disclosure may be provided.

Although the present disclosure has been described with various embodiments, various changes and modifications may be suggested to one skilled in the art. It is intended that the present disclosure encompass such changes and modifications as fall within the scope of the appended claims.

What is claimed is:

1. A portable communication device comprising:
 a camera module including an image sensor including a plurality of image pixels and a control circuit configured to control the image sensor;
 a display; and
 a processor configured to:
  activate an image capturing function of the camera module;
  based on the image capturing function being activated, obtain first raw image data comprising a specified channel pattern generated by binning image data obtained from a specified number of image pixels corresponding to a same channel with respect to the plurality of image pixels, by using the image sensor;
  display a first image generated based on the first raw image data on the display;

while the image capturing function is activated, receive an input associated with an adjustment of a zoom setting;

obtain second raw image data comprising a specified channel pattern, generated by re-mosaicing image data obtained from a portion of the plurality of image pixels corresponding to a portion of the image sensor based at least on the input, by using the image sensor; and display a second image generated based on the second raw image data on the display.

2. The portable communication device of claim 1, wherein the processor is configured to identify a position selected as a zoom region and a zoom magnification based at least on the input associated with the adjustment of the zoom setting, wherein the portion of the plurality of image pixels are image pixels corresponding to the identified zoom magnification mapped on the selected position.

3. The portable communication device of claim 1, wherein the second raw image data is raw image data generated to have a resolution corresponding to a resolution of the first raw image data.

4. The portable communication device of claim 1, wherein the processor is configured to:

identify ambient illuminance; and when the ambient illuminance is within a specified illuminance range, use the image sensor to obtain the second raw image data.

5. The portable communication device of claim 4, wherein the processor is configured to:

when the ambient illuminance is not within the specified illuminance range, use the image sensor to obtain third raw image data generated by at least binning image data obtained from the specified number of image pixels corresponding to the same channel among the portion of the plurality of image pixels corresponding to the portion of the image sensor; and display a third image generated based on the third raw image data on the display.

6. The portable communication device of claim 1, wherein the processor is configured to:

identify a signal to noise ratio of the first image; and when the signal to noise ratio of the first image is within a specified ratio range, use the image sensor to obtain the second raw image data.

7. The portable communication device of claim 6, wherein the processor is configured to:

when the signal to noise ratio is not within the specified ratio range, use the image sensor to obtain third raw image data generated by binning image data obtained from the specified number of image pixels corresponding to the same channel among the portion of the plurality of image pixels corresponding to the portion of the image sensor; and display a third image generated based on the third raw image data on the display.

8. A portable communication device comprising:

a camera module including an image sensor including a plurality of image pixels and a control circuit configured to control the image sensor;

a display; and a processor configured to:

receive an input associated with an adjustment of a zoom setting related to capturing an image;

obtain first raw image data generated by binning image data obtained from a first set number of pixels corresponding to a same channel with respect to the plurality of image pixels based on the zoom setting being within a specified first magnification range by using the image sensor, and display a first image generated based on the obtained first raw image data on the display; and obtain second raw image data generated by re-mosaicing image data obtained from a portion of the plurality of image pixels corresponding to a portion of the image sensor based on the zoom setting being within a specified second magnification range by using the image sensor, and display a second image generated based on the obtained second raw image data on the display.

9. The portable communication device of claim 8, wherein the processor is configured to:

use the image sensor to obtain third raw image data generated by at least binning image data obtained from a second set number of pixels corresponding to the same channel with respect to the plurality of image pixels based on the zoom setting being within a specified third magnification range, wherein the second set number of pixels is different from the first set number of pixels; and display a third image generated using the third raw image data on the display.

10. The portable communication device of claim 9, wherein the processor is configured to:

use the image sensor to obtain the third raw image data, generated by binning the image data obtained from the second set number of pixels corresponding to the same channel with respect to the plurality of image pixels and then further re-mosaicing the binned image data.

11. The portable communication device of claim 9, wherein the processor is configured to:

use the image sensor to obtain the third raw image data generated by at least binning image data obtained from the second set number of pixels corresponding to the same channel among a portion of a remaining image pixels corresponding to another portion of the image sensor among the plurality of image pixels based on the zoom setting being within the specified third magnification range.

12. The portable communication device of claim 8, wherein the processor is configured to:

identify information associated with a position and a magnification of a zoom region based at least on the input associated with the adjustment of the zoom setting, and wherein the portion of the image sensor is a portion corresponding to the position and the magnification of the zoom region.

13. The portable communication device of claim 8, wherein the processor is configured to:

identify ambient illuminance;

based on the ambient illuminance being within a specified illuminance range, obtain the second raw image data comprising a specified channel pattern, generated by re-mosaicing the image data obtained from the portion of the plurality of image pixels corresponding to the portion of the image sensor, by using the image sensor;

based on the ambient illuminance not being within the specified illuminance range, obtain third raw image data generated by binning image data obtained from a specified number of image pixels corresponding to the same channel among the portion of the plurality of image pixels corresponding to the portion of the image sensor, by using the image sensor; and display a third image generated based on the third raw image data on the display.

14. The portable communication device of claim 8, wherein the processor is configured to:
identify a signal to noise ratio of the first image;
based on the signal to noise ratio is within a specified ratio range, obtain the second raw image data comprising a specified channel pattern, generated by re-mosaicing the image data obtained from the portion of the plurality of image pixels corresponding to the portion of the image sensor, by using the image sensor;
based on the signal to noise ratio not being within the specified ratio range, obtain third raw image data, generated by binning data obtained from a specified number of image pixels corresponding to the same channel among the portion of the plurality of image pixels corresponding to the portion of the image sensor, by using the image sensor; and
display a third image generated based on the third raw image data on the display.

15. A camera module comprising:
an image sensor including a plurality of image pixels; and
a control circuit for controlling the image sensor,
wherein the control circuit is configured to:
activate an image capturing function of the image sensor;
based on the image capturing function being activated, generate first raw image data having a specified channel pattern generated by binning image data obtained from a specified number of image pixels corresponding to a same channel with respect to the plurality of image pixels, by using the image sensor;
transmit the generated first raw image data to an external processor electrically connected to the control circuit;
receive a request associated with a zoom setting while the image capturing function is activated;
generate second raw image data having the specified channel pattern by re-mosaicing image data for a portion of the plurality of image pixels corresponding to a portion of the image sensor based at least on the request, by using the image sensor; and
transmit the generated second raw image data to the external processor.

16. The camera module of claim 15, wherein the control circuit is configured to generate the first raw image data or the second raw image data based on a specified resolution.

17. The camera module of claim 15, wherein the control circuit is configured to:
identify position information of the portion of the plurality of image pixels based on the request associated with the zoom setting; and
obtain image data from the portion of the plurality of image pixels corresponding to the identified position information.

18. The camera module of claim 15, wherein the control circuit is configured to:
identify information associated with a zoom magnification based on the request associated with the zoom setting;
generate the second raw image data having the specified channel pattern by re-mosaicing the image data for the portion of the plurality of image pixels corresponding to the portion of the image sensor based on the zoom magnification being within a first magnification range;
transmit the second raw image data to the external processor;
generate third raw image data having the specified channel pattern by binning image data obtained from a different specified number of image pixels corresponding to a same channel with respect to a portion of a remaining image pixels based on the zoom magnification being within a second magnification range, and then re-mosaicing the binned image data; and
transmit the third raw image data to the external processor.

19. The camera module of claim 15, wherein the plurality of image pixels includes N×N image pixels included in each channel, wherein N is a natural number equal to or greater than 2,
wherein the specified number of image pixels is a total number of image pixels included in each channel, and
wherein a different specified number of image pixels is a number of a portion of the total number of image pixels included in each channel.

\* \* \* \* \*